(12) United States Patent
Ishiguro et al.

(10) Patent No.: US 7,314,228 B2
(45) Date of Patent: Jan. 1, 2008

(54) AIRBAG DEVICE

(75) Inventors: Naohiko Ishiguro, Aichi (JP); Mitsuhiro Kikuta, Aichi (JP); Yoshiaki Maekubo, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 301 days.

(21) Appl. No.: 11/175,996

(22) Filed: Jul. 7, 2005

(65) Prior Publication Data

US 2006/0012157 A1    Jan. 19, 2006

(30) Foreign Application Priority Data

Jul. 14, 2004   (JP)   ............................. 2004-206782

(51) Int. Cl.
*B60R 21/16*   (2006.01)
*B60R 21/20*   (2006.01)

(52) U.S. Cl. ............................. 280/728.2; 280/728.1; 280/743.2

(58) Field of Classification Search ............ 280/728.1, 280/728.2, 743.1, 743.2
See application file for complete search history.

(56) References Cited

U.S. PATENT DOCUMENTS 6,070,904 A *   6/2000   Ozaki et al. ............. 280/743.1
6,099,026 A *   8/2000   Ando et al. ............... 280/728.3
6,206,409 B1 *  3/2001   Kato et al. ................ 280/728.2

FOREIGN PATENT DOCUMENTS

JP       3467114       10/1996
JP   2002-67851 A *    3/2002

* cited by examiner

*Primary Examiner*—Ruth Ilan
(74) *Attorney, Agent, or Firm*—Posz Law Group, PLC (57) ABSTRACT

An airbag device according to the present invention includes an airbag folded and housed in the shape of folded-up body, and an airbag wrapping member for keeping the folded-up configuration of the airbag. The folded-up body is formed by bringing both ends of the airbag close to a base line, such that the folded-up body is symmetric with respect to the base line. The wrapping member includes a breakable portion in a region above the base line. The breakable portion includes a plurality of apertures each of which is located across the base line as to extend toward both sides from the base line, and connecting portions for connecting adjacent apertures into a larger opening upon breakage. The connecting portions disposed by the side of both ends of each of the apertures are located in opposite sides of the base line. The wrapping member further includes two cut-out portions in edges of a cover portion in a direction along the base line.

5 Claims, 8 Drawing Sheets

AIRBAG DEVICE

The present application claims priority from Japanese Patent Application No. 2004-206782 of Ishiguro et al., filed on Jul. 14, 2004, the disclosure of which is hereby incorporated into the present application by reference.

BACKGROUND OF THE INVENTION

1. Field of the Invention

The present invention relates to an airbag device including a bag-shaped airbag which is, when housed, folded into a folded-up body having a generally rectangular parallelepiped shape, and an airbag wrapping member mounted around the folded-up body to keep the folded-up configuration.

2. Description of Related Art

In the prior art, Japanese Patent No. 3467114 discloses an airbag device including an airbag which is folded into a folded-up body with reference to a straight base line running through a center of a gas inlet port along a plane of the inlet port above the inlet port. The folded-up body is formed by, from a state right before completely folded-up configuration, bringing both ends of the airbag extending in opposite directions from the base line, close to the base line to butt against each other. As a result, the folded-up body has a generally rectangular parallelepiped shape symmetric with respect to the base line.

An airbag wrapping cloth is arranged to wrap the folded-up body with its both ends in a direction perpendicular to the base line secured to the airbag. In a position of the wrapping cloth correspondent to the base line is a generally straight breakable portion having intermittent perforations breakable upon airbag inflation.

In a conventional airbag device, however, when the wrapping cloth is mounted around the folded-up body in a condition that a butt portion of the ends of the airbag, which is to be disposed proximate to the base line, is deviated from the breakable portion of the wrapping cloth, the breakable portion is not likely to be broken smoothly upon airbag deployment. This is caused by arranging the breakable portion straightly along the base line. Moreover, some folded-up bodies have a butt portion, too, in an internal position thereof, where airbag portions are folded to butt each other close to the base line. In this case, the position of the internal butt portion is not easy to grasp from the outside. Accordingly, there is a challenge in improving accuracy in making the position of the internal butt portion of the folded-up body generally consistent with the position of the breakable portion.

SUMMARY OF THE INVENTION

The present invention has an object to provide an airbag device capable of breaking the breakable portion of the airbag wrapping member stably upon airbag inflation.

This object is achieved by an airbag device including: a bag-shaped airbag folded and housed in the form of a generally rectangular parallelepiped folded-up body; and a wrapping member wrapped around the folded-up body for keeping the folded-up configuration, wherein:

the airbag includes an inlet port for admitting inflation gas, and the airbag is folded, when folded into the folded-up body, in reference to a straight base line running through the center of the inlet port along a plane of the inlet port above the inlet port, such that, from a state right before a completely folded-up configuration, both ends of the airbag extending in opposite directions from the base line are brought close to the base line to butt against each other, whereby the folded-up body is formed into a generally rectangular parallelepiped shape symmetric with respect to the base line;

the wrapping member is made of flexible sheet-shaped material, and is breakable upon airbag inflation;

the wrapping member includes: a cover portion for holding top face of the folded-up body, the cover portion including a breakable portion in a region above the base line; and fixing portions located in extensions from the cover portion perpendicular to the base line and fixed to the folded-up body;

the breakable portion separates the cover portion along a direction of the base line upon airbag inflation, and includes a plurality of apertures going through the cover portion, and connecting portions for connecting adjacent apertures into a larger opening upon breakage;

each of the apertures is located across the base line as to extend toward both sides from the base line, whereby the connecting portions disposed by the side of both ends of each of the aperture are located in opposite sides of the base line;

the wrapping member further includes two cut-out portions in edges of the cover portion in a direction along the base line, between each of the cut-out portions and an aperture disposed in the vicinity of the cut-out portion being a marginal connecting portion that is breakable upon airbag inflation; and the two cut-out portions are located in generally symmetric positions with respect to a point in the base line correspondent to the center of the inlet port.

In the airbag device according to the present invention, the wrapping member is provided with the cut-out portions in both edges of the cover portion in a direction along the base line. The cut-out portions help check a position of a butt portion of ends of the airbag brought close to the base line which appears on the surface of the folded-up body, after the folded-up body is wrapped by the wrapping member. More specifically, since the cut-out portions are located proximate to the apertures as part of the breakable portion, if the butt portion largely deviates from the breakable portion when wrapping the folded-up body by the wrapping member, the butt portion is exposed from the cut-out portions. Accordingly, the cut-out portions help confirm the position of the butt portion in the wrapping work of the wrapping member around the folded-up body, as well as keep the folded-up body in shape. As a result, the airbag device is prevented from being mounted on vehicle in a condition that the butt portion of the folded-up body largely deviates from the breakable portion.

In the airbag device of the present invention, the breakable portion is broken by breakage of the connecting portions that are located in opposite sides of the base line. With this construction, even if the wrapping member wraps the folded-up body in a condition that the butt portion is a little deviated from the base line, stress concentration occurs in the vicinity of the connecting portions more proximate to the butt portion, and these connecting portions are broken firstly, and then the connecting portions away from the butt portion are broken. Therefore, the breakable portion is smoothly broken. Of course, in an airbag device whose folded-up body includes, in interior thereof, folded portions each of which is folded to butt each other close to the base line, even if the butt portion located inside the folded-up body deviates from the base line a little, the breakable portion is broken smoothly. In other words, in the airbag device of the present invention, if the butt portion is arranged in a range between the connecting portions located in opposite sides of the base line, stress up to completion of breakage is averaged. Therefore, stable breakage performance is secured even if the position of the butt portion varies from airbag device to airbag device.

In a conventional airbag device, in comparison, if a wrapping cloth is mounted around a folded-up body in a condition that a butt portion is deviated from the base line, there arises a deviation between positions of the butt portion and a breakable portion. This hinders stress concentration from occurring on the breakable portion in the initial stage of airbag inflation, and hinders swift breakage of the breakable portion. Especially, as the butt portion is more distant from the base line, stress concentration is less likely to occur on the breakable portion, so that the breakable portion does not break swiftly.

Therefore, in the airbag device of the present invention, the breakable portion of the wrapping member is stably broken upon airbag inflation.

In the above airbag device, it is desired that the wrapping member is made of woven fabric, and that the wrapping member further includes a plurality of auxiliary slits, each of the auxiliary slits being located toward the fixing portion by the side of the connecting portion and the marginal connecting portion, by cutting threads running perpendicularly to the base line.

With this arrangement, the threads intersecting the base line are cut in advance by the auxiliary slits, in the vicinity of the connecting portions and the marginal connecting portions as part of the breakable portion. Accordingly, the portions are easily broken upon airbag inflation.

In the airbag device constructed as above, moreover, it will also be appreciated that at least an aperture located in the center of the cover portion has an opening large enough for the butt portion of the ends of the airbag to be visible therefrom, when the wrapping member is mounted around the folded-up body. With this construction, the position of the butt portion in the vicinity of the center of the folded-up body is confirmed from the aperture, in the wrapping work of the wrapping member around the folded-up body.

If each of the apertures is disposed to intersect a wrapping direction of the wrapping member which is generally perpendicular to the base line, the aperture is prevented from catching surrounding members even when the folded-up body is housed in a limited space close to the surrounding members.

Furthermore, in the above airbag device, it will also be appreciated that a width of the cover portion in a direction along the base line is generally the same as a width of the folded-up body in a direction along the base line. This construction securely prevents the folded-up body from going out of shape, and also prevents the wrapping member from becoming too bulky. Therefore, this construction is suitable for an airbag device having limited space for the folded-up body.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
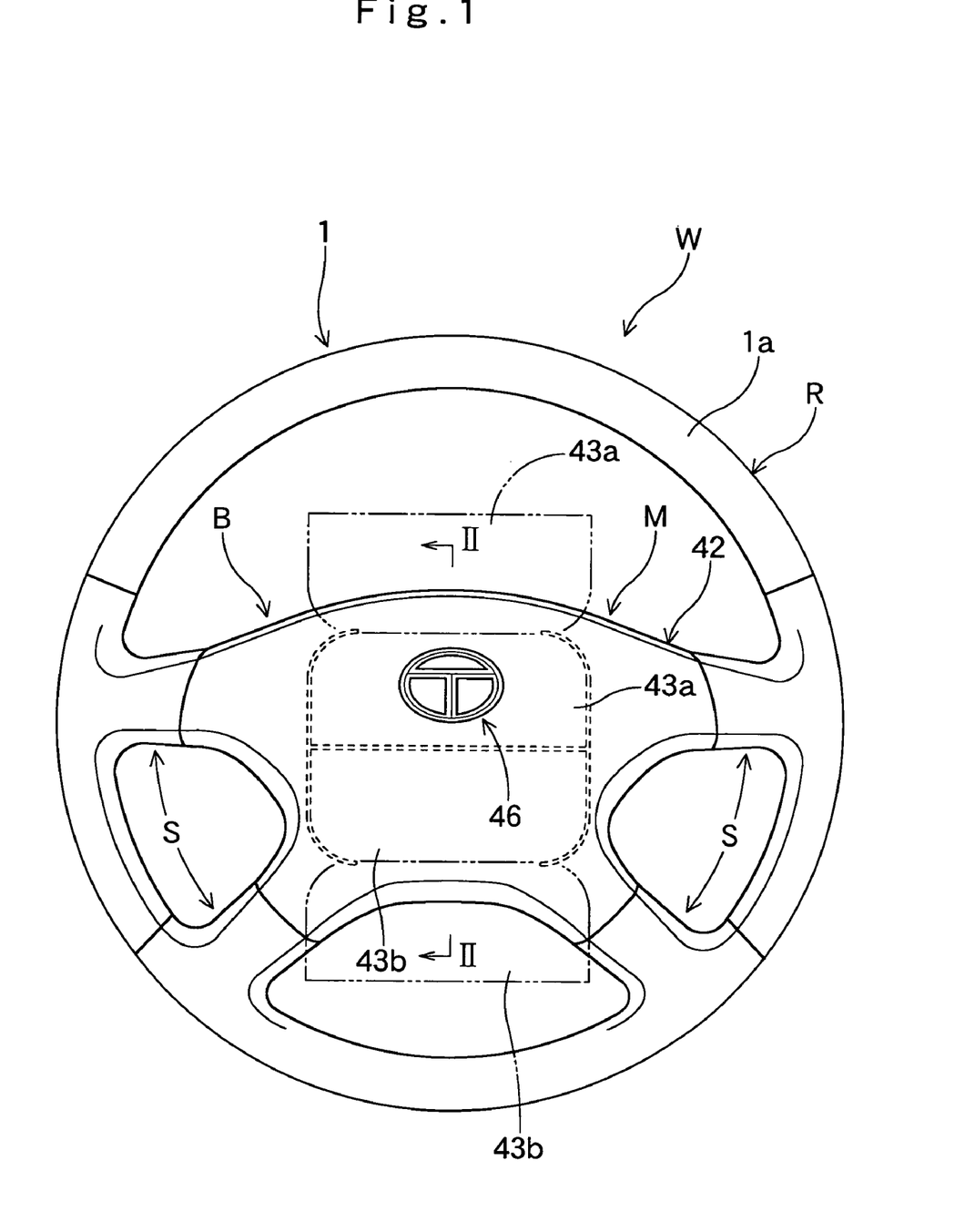
FIG. 1 is a plan view of a steering wheel employing an airbag device according to the present invention.
Figure 2:
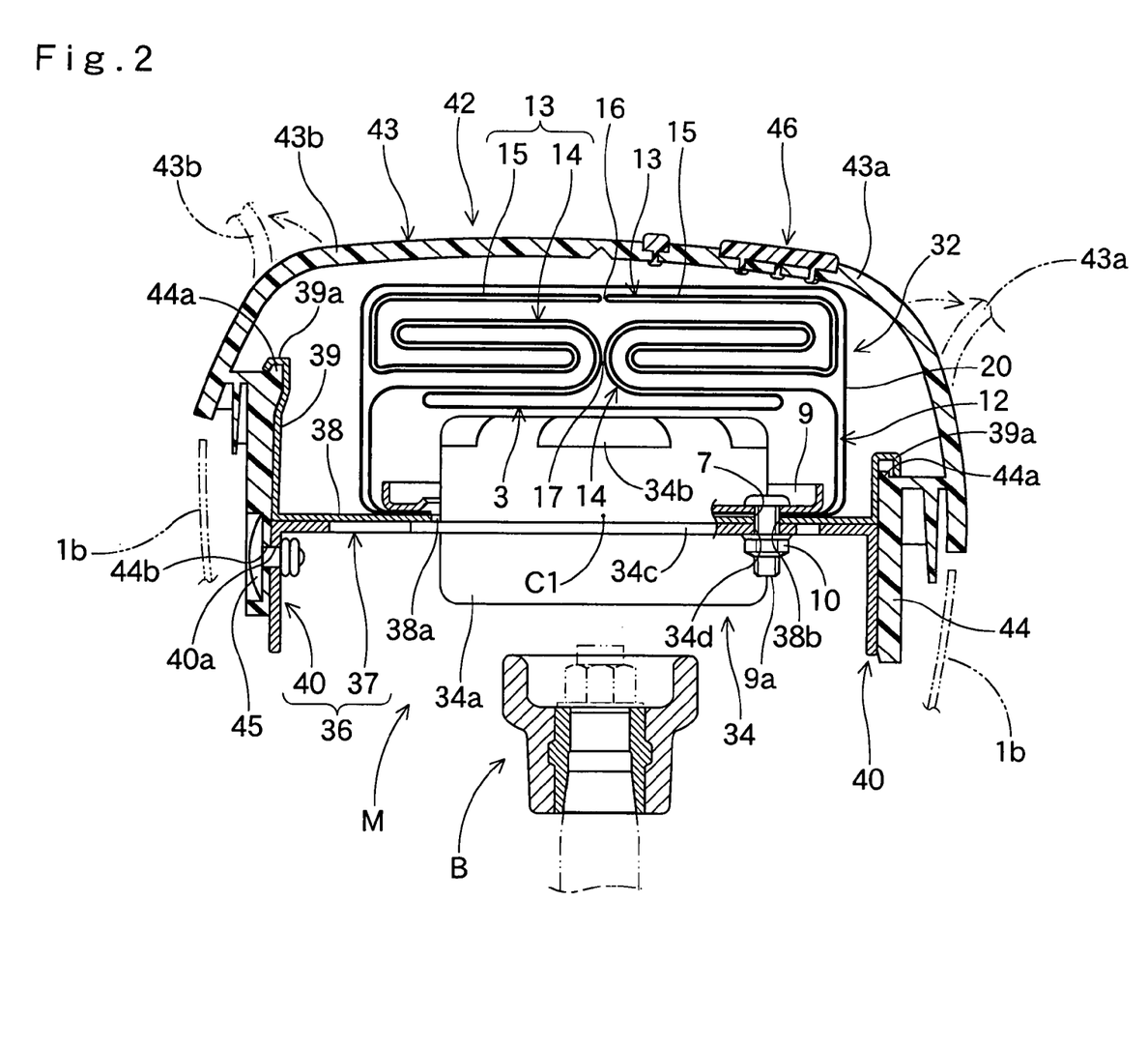
FIG. 2 is a schematic section of the steering wheel of FIG. 1, taken along line II-II of FIG. 1.

FIGS. 1 and 2 illustrate an airbag device M for steering wheel according to the present invention. Unless otherwise specified, front-rear, up-down, and left-right directions in this specification are based on a steering wheel W mounted on a vehicle and being steered straight forward. Specifically, up-down is defined by up-down along axial direction of unillustrated steering shaft with which the steering wheel W is to be assembled. Front-rear is defined by vehicle's front-rear direction which is perpendicular to the axial direction of the steering shaft, and left-right is defined by vehicle's left-right direction which is perpendicular to the axial direction of the steering shaft.

The steering wheel W includes an annular ring R, a boss B and four spokes S. The ring R is for hand-holding at the time of steering operation. The boss B is disposed at the center of the ring R. Each of the spokes S connects the ring R and the boss B. The airbag device M is arranged at upper side of the boss B. The steering wheel W includes, as constituent parts, the airbag device M and a steering wheel body 1, which is a part except the airbag device M.

The steering wheel body 1 includes an unillustrated steering wheel core, a covering layer 1a and a lower cover 1b. The core is arranged in each of the ring R, the boss B and the spokes S. The covering layer 1a is made from synthetic resin such as urethane, and covers the core of the ring R and the spokes S at side of the ring R. The lower cover 1b is made from synthetic resin such as polypropylene for covering lower side of the body 1, as shown in FIG. 2.

Referring to FIG. 2, the airbag device M includes a bag-shaped airbag 3, which is folded and housed, a wrapping member 20 for wrapping the folded airbag 3, an inflator 34 for supplying the airbag 3 with inflation gas, a pad 42 as airbag cover for covering the folded airbag 3 from above and sides, and a bag holder 36 for holding the airbag 3, the inflator 34 and the pad 42. The airbag device M is held by the steering wheel body 1 with unillustrated horn switches interposed therebetween. Accordingly, the horns are activated by pressing down the airbag device M.

Figure 6A:
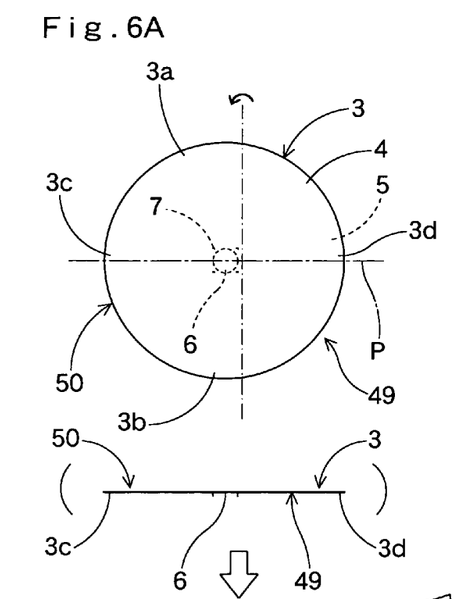
FIGS. 6A to 6D, and 7A to 7E illustrate, in order, a folding process of an airbag employed in the airbag device of the present invention.

The airbag 3 is made of woven fabric of polyester, polyamide or the like. In the foregoing embodiment, the airbag 3 is made of an occupant's side base cloth 4 and a body side base cloth 5 each of which has the same round contour, by joining edges of the cloths 4 and 5, as shown in FIG. 6A. At the center of the body side base cloth 5 is a round gas inlet port 6. Around the inlet port 6 are a plurality of (four, in the foregoing embodiment) through holes 7 for inserting bolts 9a of a retainer 9 therethrough. The airbag 3 is held by the bag holder 36 by the generally annular retainer 9 holding periphery of the inlet port 6. The retainer 9 includes a plurality of (four, in the foregoing embodiment) bolts 9a which are to be inserted through the through holes 7, through holes 38b of the bag holder 36, and through holes 34d of a flange 34c in the inflator 34, and then be fastened into nuts 10.

Figure 5:
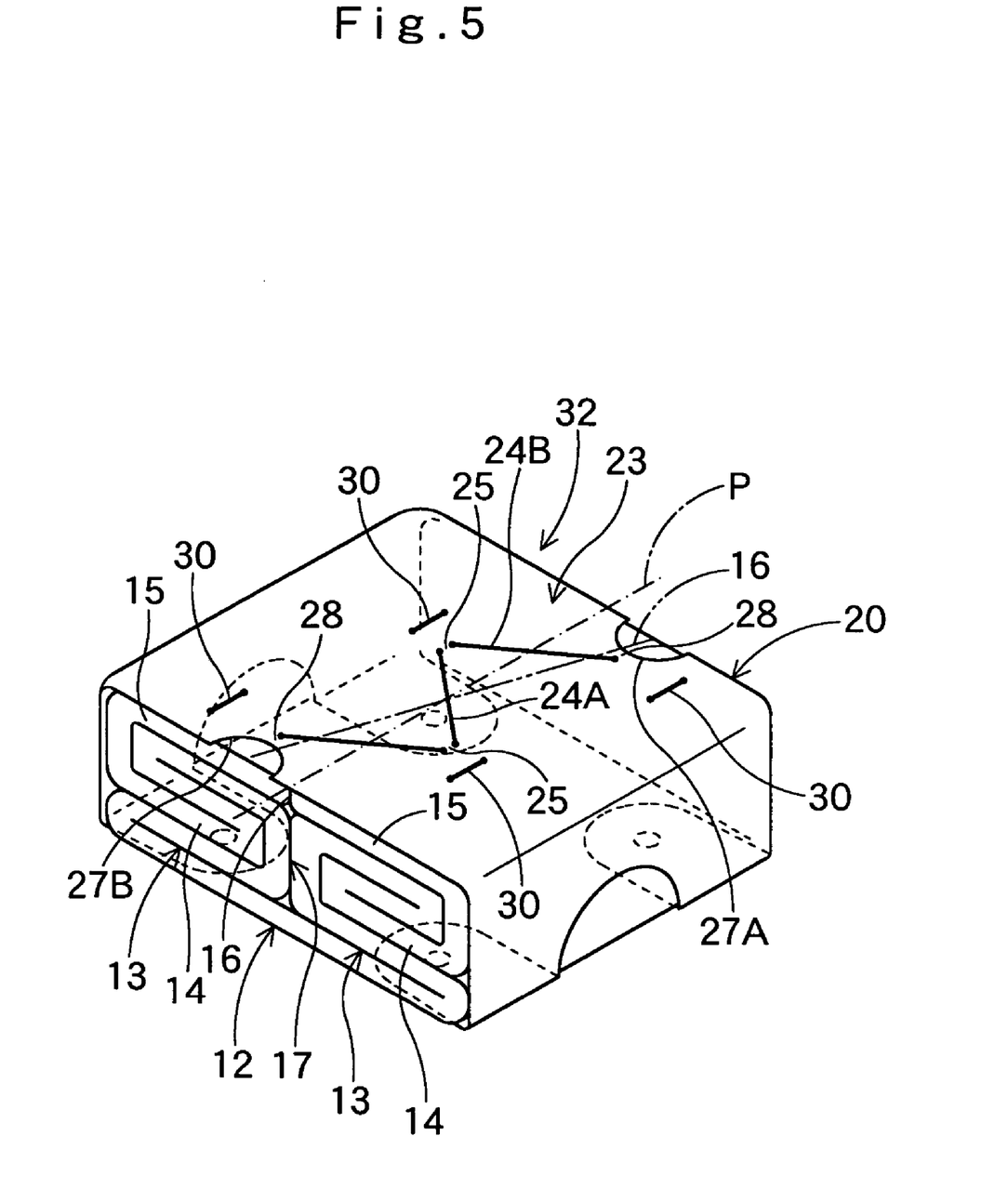
FIG. 5 is a perspective view of a wrapped body in which the wrapping member is mounted around the folded-up body.

The airbag 3 is attached to the bag holder 36 in the form of a wrapped body 32, as shown in FIGS. 2 and 5. The wrapped body 32 represents the airbag 3 which is folded up and wrapped by the wrapping member 20. The airbag 3 folded up with the retainer 9 put inside and the bolts 9a projected from the through holes 7 will be called a folded-up body 12.

Figure 4:
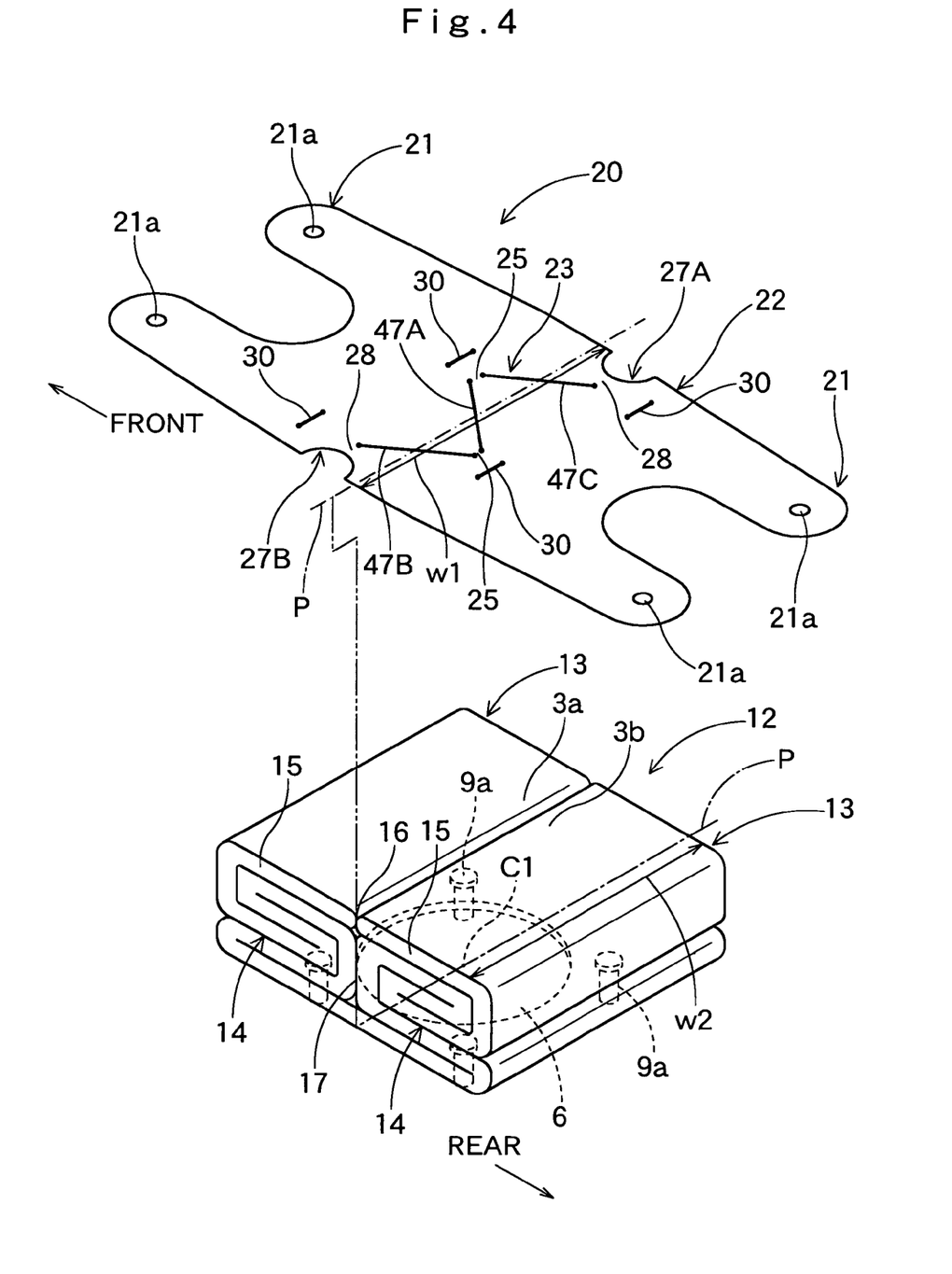
FIG. 4 is an exploded perspective view showing a folded-up body of the airbag device of the present invention and the wrapping member of FIG. 3.

As shown in FIG. 4, the folded-up body 12 has a generally rectangular parallelepiped shape. More specifically, provided that a straight line running through the center C1 of the inlet port 6 along a plane of the inlet port 6 above the inlet port 6 is a base line P, the folded-up body 12 is formed by, from a state right before folding up the airbag 3 completely, bringing both ends 3a and 3b extending forward and rearward from the base line P close to the base line P to butt against each other, such that the folded-up body 12 is symmetric with respect to the base line P. In the illustrated embodiment, the folded-up body 12 has two fold masses 13 arranged side by side along front-rear direction and above the inlet port 6.

The fold masses 13 are arranged generally symmetric with respect to the base line P, and provide, in the center of the folded-up body 12, straight butt portions 16 and 17 extending in left-right direction along the base line P. Each of the fold masses 13 includes an internal mass 14 located inside and a turned-back portion 15 located above the internal mass 14. The turned-back portions 15 are formed by turning back the front and rear ends 3a and 3b of the airbag 3 such that the ends 3a and 3b may be brought close to each other. In the illustrated embodiment, the butt portion 16 is provided between the turned-back portions 15, while the butt portion 17 is provided between the internal masses 14.

The inflator 34 includes a generally columnar inflator body 34a provided at upper part thereof with gas discharge ports 34b, and a flange 34c disposed around the body 34a. The flange 34c has through holes 34d for inserting the bolts 9a of the retainer 9 therethrough.

The bag holder 36 includes a holder body 37 and two support plates 40, each of which is made of sheet metal, as shown in FIG. 2. The support plates 40 are fixed to front and rear parts of the holder body 37.

The holder body 37 includes a bottom wall 38 having a generally square plate shape, and a sidewall 39 extending upward from circumferential edge of the bottom wall 38. The bottom wall 38 is provided in its center with a round insert hole 38a for setting-in the inflator body 34a therefrom from lower side. Around the insert hole 38a are through holes 38b for inserting through the bolts 9a of the retainer 9. The side wall 39 is provided at upper end with retaining pawls 39a extending outward and downward. The retaining pawls 39a are to be retained by stepped portions 44a of a side wall 44 of the pad 42.

Each of the two support plates 40 fixed to front and rear of the holder body 37 is provided with each one unillustrated horn switch in lower sides of left and right leading ends thereof. Each of the horn switches is arranged between an unillustrated joint of the support plate 40 and an unillustrated fixing plate fixed to the core of the spoke S, which is located below the joint. Each of the support plates 40 includes joint holes 40a for inserting rivets 45 therethrough.

The pad 42 is made from synthetic resin such as thermoplastic elastomer or the like of olefins, styrenes or the like. The pad 42 includes a ceiling wall 43 and a side wall 44 extending downward from outer circumferential edge of the ceiling wall 43 in a generally square cylindrical shape. The ceiling wall 43 covers over the folded airbag 3 by its part inside the sidewall 44. This part of the ceiling wall 43 covering the airbag 3 is provided with two doors 43a and 43b openable toward front and rearwards upon airbag inflation. Around the doors 43a and 43b is a thinned breakable portion (reference numeral omitted) adapted to help open the doors 43a and 43b when pushed by the airbag 3. The breakable portion has a generally H-shape as viewed from above. In an area of the front door 43a is an ornament 46 made from synthetic resin, which is secured to the door 43a with retaining legs (reference numeral omitted) projecting downward.

The side wall 44 includes a plurality of joint holes 44b through in horizontal direction. The rivets 45 are inserted through the joint holes 44b to fix the pad 42 to the bag holder 36.

Figure 3:
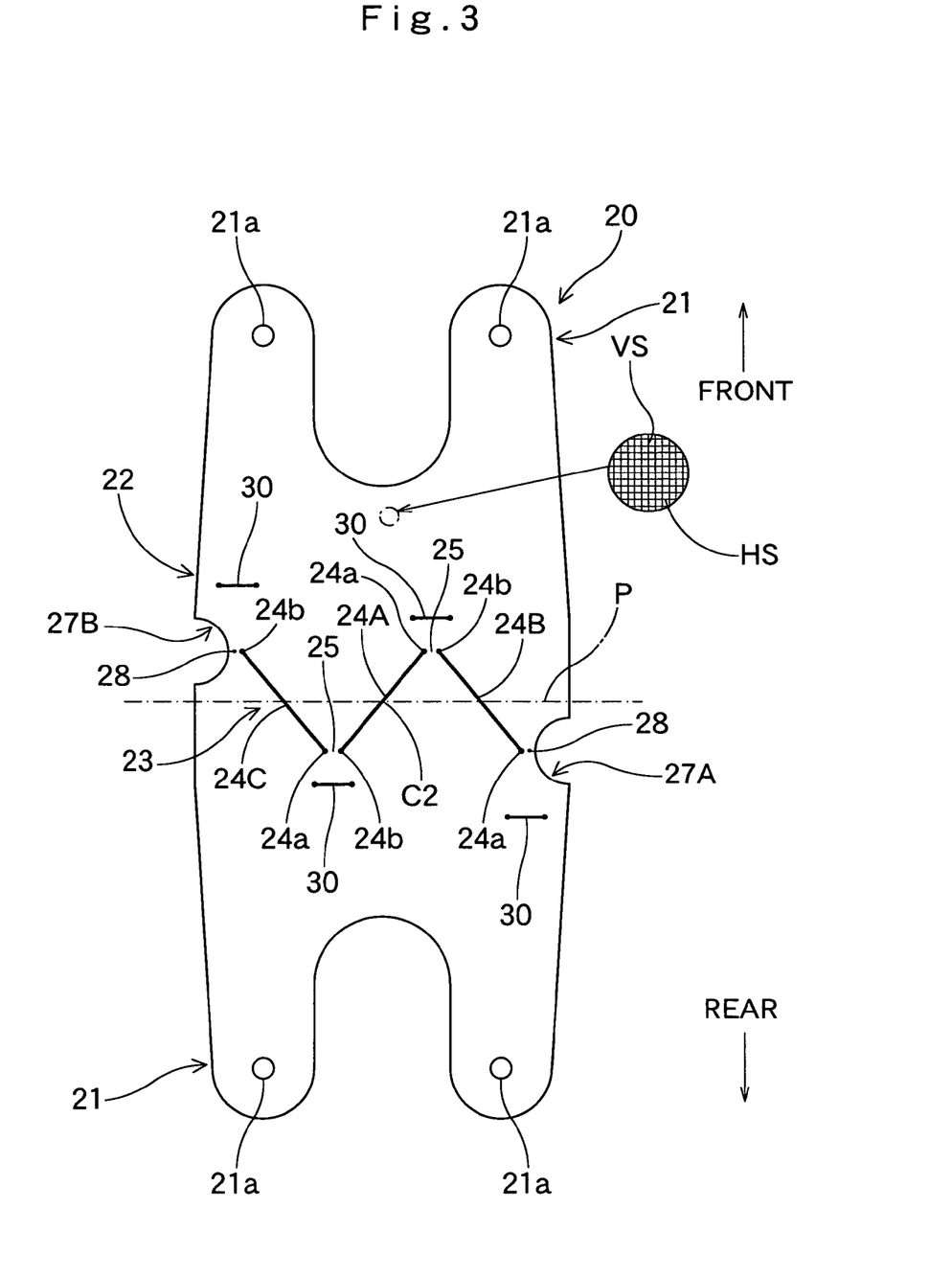
FIG. 3 is a plan view of a wrapping member employed in the airbag device of the present invention.

The airbag wrapping member 20 is made from polyester, polyamide yarn or the like as the airbag 3. The wrapping member 20 is made of a fabric piece whose weft HS extends along the base line P. In the illustrated embodiment, the member 20 has a generally rectangular shape whose length direction is in front-rear direction. The wrapping member 20 includes a cover portion 22 for holding top face of the folded-up body 12, and fixing portions 21 which extend from the cover portion 22 perpendicularly to the base line P, i.e., in the front-rear direction, and are fixed to the folded-up body 12. The cover portion 22 includes a breakable portion 23 that is located in a region above the base line P. In the illustrated embodiment, the wrapping member 20 has a generally symmetric shape with respect to the base line P whose center in the front-rear direction agrees with the base line P, and a center C2 of this center line agrees with a center C1 of the inlet port 6. Transverse width w1 of the cover portion 22 in a direction along the base line P is generally the same as transverse width w2 of the folded-up body 12 in a direction along the base line P or the butt portion 16, as shown in FIG. 4.

Each of the fixing portions 21 has such a shape as its front/rear edge is cut out in a generally semicircular shape in transverse center thereof. Each of the fixing portions 21 is provided in front/rear end vicinity with insert holes 21a for inserting the bolts 9a of the retainer 9 projected out of the folded-up body 12.

The breakable portion 23 is adapted to separate the cover portion 22 in a direction along the base line P, or in the left-right direction upon airbag inflation. The breakable portion 23 includes a plurality of (three, in the illustrated embodiment) slits 24 as aperture going through the cover portion 22, and two connecting portions 25 for connecting the adjacent slits 24 into larger opening upon breakage.

Each of the slits 24 is so located across the base line P as to extend toward both sides from the base line P, so that the connecting portions 25 disposed by the side of both ends of the slit 24 are located in opposite sides of the base line P. In the illustrated embodiment, a center slit 24A is disposed diagonally across the base line P with its right end 24a located forward and its left end 24b located rearward. Center of the slit 24A generally matches with the center C2. Each of right slit 24B and left slit 24C is symmetric, respectively, with the slit 24A with respect to a line which is slightly dislocated from end 24a or 24b and is perpendicular to the base line P (i.e., a line running in the front-rear direction). In other words, the slits 24A, 24B and 24C are arranged in a zigzag manner. A portion between the right end 24a of the slit 24C and the left end 24b of the slit 24A, and a portion between the right end 24a of the slit 24A and the left end 24b of the slit 24B constitute the connecting portions 25, respectively.

The cover portion 22 is provided, in each of the transverse edges thereof, i.e., in edges that are transverse to the base line P, with a cut-out portion 27. Between each of the cut-out portions 27 and the slits 24B/24C disposed in the vicinity thereof is a marginal connecting portion 28 that is breakable upon airbag inflation. The cut-out portions 27 are formed by cuffing out the edges generally in a semicircular shape, respectively, and are located in generally symmetric positions with respect to the center C2 of the wrapping member 20, which corresponds to the center Cl of the inlet port 6. The right cut-out portion 27A is located at the side of the right end 24a of the slit 24B, while the left cut-out portion 27B is located at the side of the left end 24b of the slit 24C.

The cover portion 22 is further provided with auxiliary slits 30 located toward the fixing portions 21 by the side of the connecting portions 25 and the marginal connecting portions 28. Each of the auxiliary slits 30 is formed along the left-right direction by cutting warps VS running perpendicularly to the base line P, i.e., in the front-rear direction.

To assemble the airbag device M, the retainer 9 is put inside the airbag 3 such that the bolts 9a are protruded from the through holes 7, and then the airbag 3 is folded up through vertical folding step and transverse folding step.

Figure 6B:
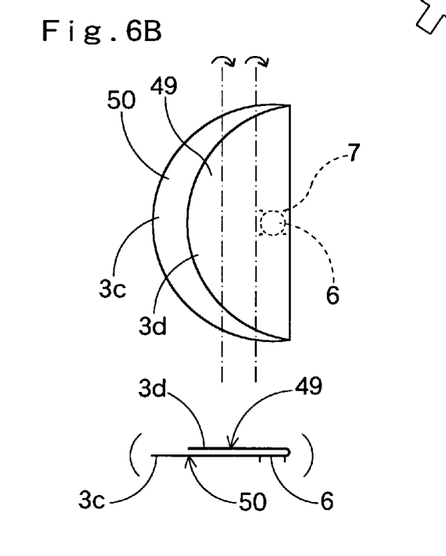
Figure 6C:
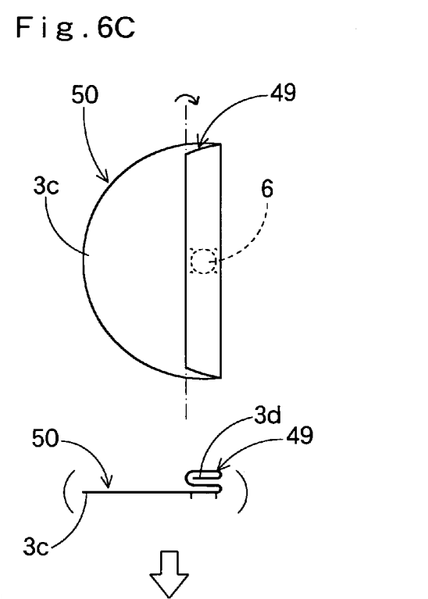
Figure 6D:
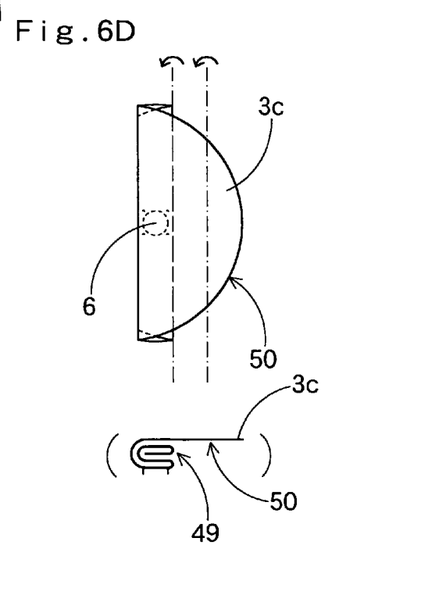
Figure 7A:
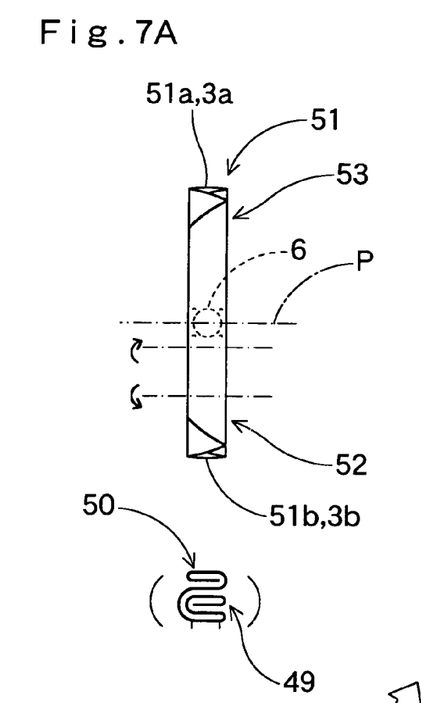

Referring to FIGS. 6A to 6D and 7A to 7E, in the vertical folding step, the airbag 3, from flatly developed state in which the occupant side base cloth 4 and the body side base cloth 5 are overlaid on each other, is folded on folds extending along front-rear direction such that left and right ends 3c and 3d are brought close to the inlet port 6. Firstly as shown in FIGS. 6A to 6C, a right portion 49 of the airbag 3 is so roll-folded toward the body side base cloth 5 along front-rear direction and is located over the inlet port 6. Then as shown in FIGS. 6D and 7A, a left portion 50 of the airbag 3 is rolled toward the body side base cloth 5 along front-rear direction and is located over the right portion 49.

Figure 7B:
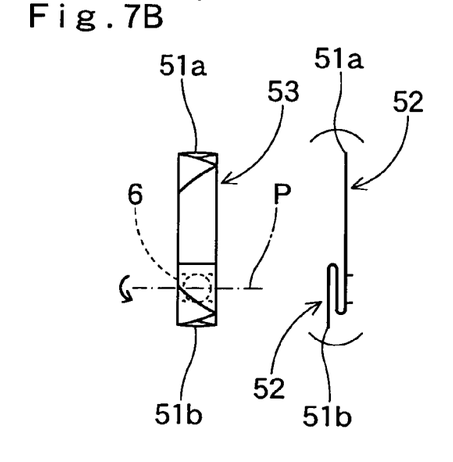
Figure 7C:
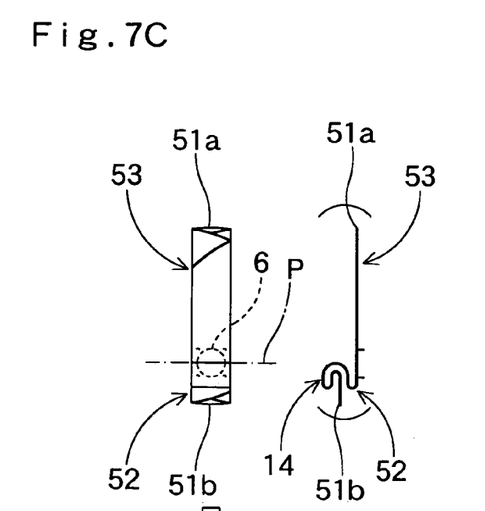
Figure 7D:
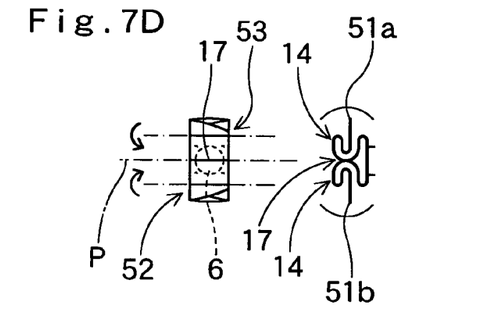
Figure 7E:
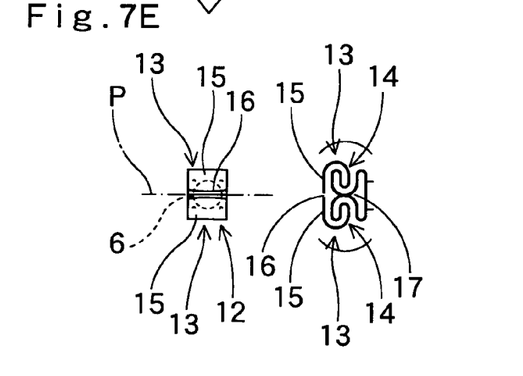

In the subsequent transverse folding step, a vertically-folded airbag 51 is folded on folds extending along left-right direction so that front and rear ends 51a and 51b of the vertically-folded airbag 51, i.e., front and rear ends 3a and 3b of the airbag 3, are brought close to the inlet port 6. Firstly as shown in FIGS. 7A and 7B, a rear portion 52 of the vertically-folded airbag 51 is folded along left-right direction so that the rear end 51b is directed rearward. Then the rear portion 52 is turned back once more on a line corresponding to the base line P, as shown in FIG. 7C. A front portion 53 of the airbag 51 is folded likewise, so that the internal masses 14 are formed to provide the butt portion 17 along the base line P therebetween, as shown in FIG. 7D. Thereafter, the ends 51a and 51b are so turned back on the inlet port 6 as to form the turned-back portions 15, thereby providing the butt portion 16 therebetween. Thus the air bag 3 is folded-up to provide the folded-up body 12 having the fold masses 13 disposed side by side in front-rear direction.

Subsequently, the wrapping member 20 is wound around the folded-up body 12 such that the cover portion 22 covers the fold masses 13. By inserting the bolts 9a through the insert holes 21a, then, the wrapped body 32 is complete.

The wrapped body 32 is now placed on the bottom wall 38 of the bag holder 36 so that the bolts 9a are protruded from the through holes 38b. Then the inflator body 34a is put into the insert hole 38a of the bottom wall 38 and then the inlet port 6 of the airbag 3 from lower side, so that the bolts 9a are protruded from the through holes 34d of the flange 34c. By fastening the bolts 9a into the nuts 10, then, the airbag 3 and inflator 34 are attached to and held by the bag holder 36.

Thereafter, the pad 42 is disposed over the airbag 3, and the retaining pawls 39a of the bag holder 36 are retained by the stepped portions 44a of the side wall 44. Meanwhile, the joint holes 40a and 44b of the bag holder 36 and the side wall 44 are matched to one another, and the rivets 45 are inserted therethrough. Thus the bag holder 36 and the side wall 44 are fastened to each other.

Then by locating the horn switches below the unillustrated joints of the support plates 40 of the bag holder 36, and by attaching the fixing plates therebelow, the airbag device M is complete.

The airbag device M thus assembled is mounted on the steering wheel body 1 by fixing the fixing plates to unillustrated mounting seats of the steering wheel body 1, which has been attached to vehicle, with predetermined bolts. At this point, assembling the steering wheel W and mounting the steering wheel W on vehicle are completed.

When inflation gas is discharged from the gas discharge ports 34b of the inflator body 34a after the mounting of the steering wheel W on vehicle, the folded airbag 3 inflates and breaks the breakable portion 23 of the wrapping member 20. Then the inflating airbag 3 pushes up the ceiling wall 43 of the pad 42, and the doors 43a and 43b of the ceiling wall 43 open by breakage of the breakable portions, so that the airbag 3 protrudes from an opening provided by opening of the doors 43a and 43b.

In the airbag device M of the foregoing embodiment, the wrapping member 20 is provided with the cut-out portion 27 in each of transverse edges of the cover portion 22, i.e., in edges that are transverse to the base line P. After the folded-up body 12 is wrapped by the wrapping member 20, the cut-out portions 27 help check a position of the butt portion 16 which appears on the surface of the folded-up body 12, where ends of the airbag 3 meet each other close to the base line P. More specifically, since the cut-out portions 27 are located proximate to the slits 24 as part of the breakable portion 23, if the butt portion 16 is largely deviated from the breakable portion 23 when wrapping the folded-up body 12 by the wrapping member 20, the butt portion 16 is exposed from the cut-out portions 27, as Indicated by double-dotted lines in FIG. 5. Accordingly, the cut-out portions 27 help confirm the position of the butt portion 16 in the wrapping work of the wrapping member 20 around the folded-up body 12, and also help keep the folded-up body 12 in shape. As a result, the airbag device M is prevented from being mounted on vehicle in a condition that the butt portion 16 of the folded-up body 12 is largely deviated from the breakable portion 23.

In the airbag device M, moreover, the breakable portion 23 is broken by breakage of the connecting portions 25 that are located in opposite sides of the base line P. With this construction, even if the wrapping member 20 wraps the folded-up body 12 in a condition that the butt portion 16 is a little deviated from the base line P, stress concentration occurs in the vicinity of the connecting portions 25 more proximate to the butt portion 16, and these connecting portions 25 are broken firstly, and then the connecting portions 25 away from the butt portion 16 are broken. Therefore, the breakable portion 23 is smoothly broken.

In the airbag device M of the foregoing embodiment, the butt portion 17 provided between the internal masses 14 is not exposed to surface since each of the fold masses 13 of the folded-up body 12 has a structure in which the turned-back portion 15 is placed over the internal mass 14. In the airbag device M, however, the breakable portion 23 is smoothly broken even if the butt portion 17 is a little deviated from the base line P.

In other words, in the airbag device M, if the butt portions 16 and 17 are arranged in a range between the connecting portions 25 located in opposite sides of the base line P, stress up to completion of breakage is averaged. Therefore, stable breakage performance is secured even if positions of the butt portions 16 and 17 vary from airbag device to airbag device.

In a conventional airbag device, in comparison, if a wrapping cloth is mounted around a folded-up body in a condition that a butt portion is deviated from the base line, there arises a deviation between positions of the butt portion and a breakable portion. This hinders stress concentration from occurring on the breakable portion in the initial stage of airbag inflation, and hinders swift breakage of the breakable portion. Especially, as the butt portion is more distant from the base line, stress concentration is less likely to occur on the breakable portion, so that the breakable portion does not break swiftly.

Therefore, in the airbag device of the foregoing embodiment, the breakable portion 23 of the wrapping member 20 is stably broken upon airbag inflation.

In the airbag device M of the foregoing embodiment, the wrapping member 20 is provided with a plurality of auxiliary slits 30, by the side of the connecting portions 25 and the marginal connecting portions 28 and toward the fixing portions 21. Each of the auxiliary slits 30 is formed along the left-right direction by cutting warps VS running perpendicularly to the base line P, i.e., in the front-rear direction. That is, the warps VS intersecting with the base line P is cut in advance by the auxiliary slits 30, in the vicinity of the connecting portions 25 and the marginal connecting portions 28 as part of the breakable portion 23. Accordingly, the portions 25 and 28 are easily broken upon airbag inflation. Without considering this point, the wrapping member does not necessarily have to include auxiliary slits. Of course, the wrapping member may be made of a synthetic resin film, and in that case, omitting auxiliary slits will bring about no difficulties.

Figure 8:
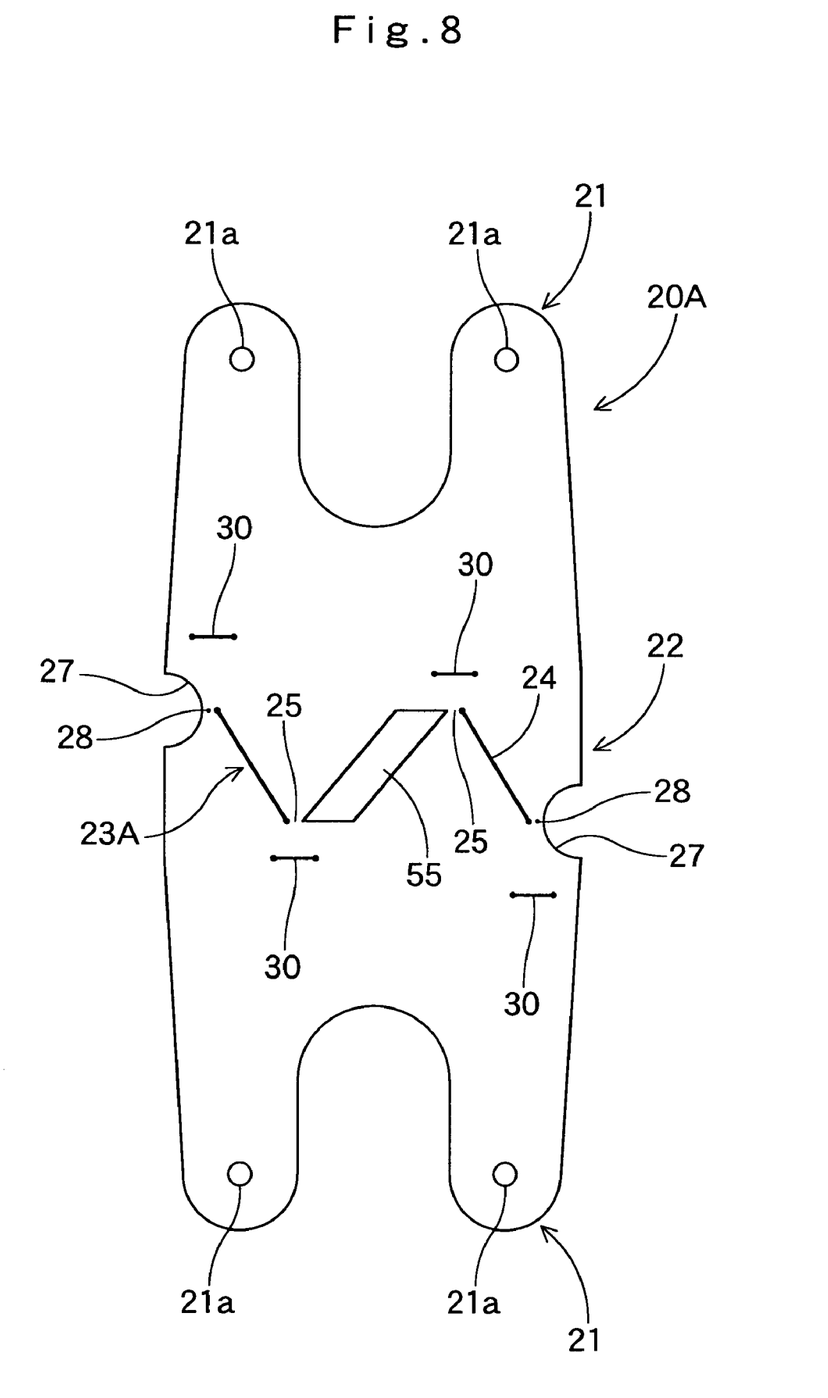
FIG. 8 is a plan view of a modification of the wrapping member.

It will also be appreciated to adopt a wrapping member 20A shown in FIG. 8 which includes a breakable portion 23A provided with a parallelogram shaped opening 55 as aperture. With this wrapping member 20A, the opening 55 helps check the position of the butt portion 16 in the vicinity of the center of the folded-up body 12, in the wrapping work of the wrapping member 20A around the folded-up body 12. Of course, the number of the opening 55 should not be limited to one, but the wrapping member may include more than one opening 55.

In the wrapping member 20 whose apertures providing the breakable portion 23 are exclusively constituted by the slits 24, each of the slits 24 is arranged diagonally to intersect a wrapping direction of the wrapping member 20, i.e., the front-rear direction. Accordingly, when the wrapping member 20 is wrapped around the folded-up body 12, the slits 24 are hardly enlarged to provide larger openings. With this arrangement, even when the pad 42 having an ornament 46 is located proximate to the housed folded-up body 12, as in the airbag device M, for example, it is prevented that the slits 24 catch retaining pawls of the ornament 46 projected from back side of the pad 42. Therefore, assembling work of the pad 42 is facilitated.

Moreover, in the airbag device M of the foregoing embodiment, the transverse width w1 of the cover portion 22 of the wrapping member 20 in a direction along the base line P is generally the same as the transverse width w2 of the folded-up body 12 in a direction along the base line P or the butt portion 16. This construction securely prevents the folded-up body 12 from going out of shape, and also prevents the wrapping member 20 from becoming too bulky. Therefore, this construction is suitable for an airbag device having limited space for the folded-up body 12.

Although the foregoing embodiment shows the airbag device M for steering wheel, the present invention should not be limited thereby, but may be applied to an airbag device for front passenger's seat, for instance, as long as it is an airbag device whose airbag is folded up to have two fold masses disposed side by side to be generally symmetric.

Moreover, in the airbag device M, the folded-up body 12 is configured such that each of the two fold masses 13 includes the internal mass 14 located inside and the turned-back portion 15 located thereabove. However, configuration of the folded-up body applicable to the present invention should not be limited thereby, but the fold masses may be rolled, or folded in a bellows-fashion on transverse folds.

What is claimed is:

1. An airbag device comprising: a bag-shaped airbag folded and housed in the form of a generally rectangular parallelepiped folded-up body; and a wrapping member wrapped around the folded-up body for keeping the folded-up configuration, wherein:

the airbag includes an inlet port for admitting inflation gas, and the airbag is folded, when folded into the folded-up body, in reference to a straight base line running through the center of the inlet port along a plane of the inlet port above the inlet port, such that, from a state right before a completely folded-up configuration, both ends of the airbag extending in opposite directions from the base line are brought close to the base line to butt against each other, whereby the folded-up body is formed into a generally rectangular parallelepiped shape symmetric with respect to the base line;

the wrapping member is made of flexible sheet-shaped material, and is breakable upon airbag inflation;

the wrapping member comprises:

a cover portion for holding a top face of the folded-up body, the cover portion including a breakable portion in a region above the base line; and fixing portions located in extensions from the cover portion perpendicular to the base line and fixed to the folded-up body;

the breakable portion separates the cover portion along a direction of the base line upon airbag inflation, and includes a plurality of apertures going through the cover portion, and connecting portions for connecting adjacent apertures into a larger opening upon breakage;

each of the apertures is located across the base line as to extend toward bath sides from the base line, whereby connecting portions disposed by sides of both of two ends of each of the apertures are located in opposite sides of the base line;

the wrapping member further comprises two cut-out portions in edges of the cover portion that are transverse to the base line, between each of the cut-out portions and an aperture disposed in the vicinity of the cut-out portion being a marginal connecting portion that is breakable upon airbag inflation; and the two cut-out portions are located in generally symmetric positions with respect to a point in the base line corresponding to the center of the inlet port.

2. The airbag device according to claim 1, wherein:

the wrapping member is made of woven fabric; and the wrapping member further comprises a plurality of auxiliary slits, each of the auxiliary slits being located toward the fixing portion by the side of the connecting portion and the marginal connecting portion, by cutting threads running perpendicularly to the base line.

3. The airbag device according to claim 1 wherein at least an aperture located in the center of the cover portion has an opening large enough for a butt portion of the ends of the airbag to be visible therefrom, when the wrapping member is mounted around the folded-up body.

4. The airbag device according to claim 1, wherein each of the apertures has a slit shape, and is disposed to intersect a wrapping direction of the wrapping member, the wrapping direction being generally perpendicular to the base line.

5. The airbag device according to claim 1, wherein a width of the cover portion in a direction along the base line is generally the same as a width of the folded-up body in a direction along the base line.

* * * * *